United States Patent
Matsuda et al.

(10) Patent No.: US 6,854,738 B2
(45) Date of Patent: Feb. 15, 2005

(54) SEALING STRUCTURE FOR COMBUSTOR LINER

(75) Inventors: Yoshihiro Matsuda, Kobe (JP); Masayoshi Kobayashi, Kobe (JP); Takanobu Yoshimura, Akashi (JP); Hiroaki Miyamoto, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/372,794

(22) Filed: Feb. 26, 2003

(65) Prior Publication Data

US 2004/0036230 A1 Feb. 26, 2004

(30) Foreign Application Priority Data

Aug. 22, 2002 (JP) .......................................... 2002-241258

(51) Int. Cl.[7] .............................. F16J 15/02; F02C 7/20
(52) U.S. Cl. ........................... 277/632; 277/637; 60/800
(58) Field of Search ............................... 277/630, 637, 277/634, 632; 60/800

(56) References Cited

U.S. PATENT DOCUMENTS

| | | | | |
|---|---|---|---|---|
| 3,144,255 A | * | 8/1964 | Thorne et al. ............... 277/632 |
| 3,186,168 A | * | 6/1965 | Ormerod et al. ............... 60/796 |
| 3,295,824 A | * | 1/1967 | Woodwell et al. .......... 415/178 |
| 3,965,066 A | * | 6/1976 | Sterman et al. ............... 60/800 |
| 4,688,378 A | * | 8/1987 | Harris ........................... 60/800 |
| 4,821,522 A | * | 4/1989 | Matthews et al. ............ 60/757 |
| 4,932,207 A | * | 6/1990 | Harris et al. ................... 60/799 |
| 5,118,120 A | * | 6/1992 | Drerup et al. ............... 277/628 |
| 5,125,796 A | * | 6/1992 | Cromer ................... 415/174.2 |
| 5,143,292 A | * | 9/1992 | Corsmeier et al. ........ 239/127.3 |
| 5,265,412 A | * | 11/1993 | Bagepalli et al. ............. 60/800 |
| 5,289,677 A | * | 3/1994 | Jarrell .......................... 60/796 |
| 5,337,583 A | * | 8/1994 | Giles et al. ................... 60/752 |
| 5,560,198 A | * | 10/1996 | Brewer et al. ................ 60/766 |
| 5,797,723 A | * | 8/1998 | Frost et al. ............... 415/174.2 |
| 5,987,879 A | * | 11/1999 | Ono ............................. 60/800 |
| 6,347,508 B1 | * | 2/2002 | Smallwood et al. ........... 60/796 |
| 6,402,466 B1 | * | 6/2002 | Burdgick et al. ......... 415/173.3 |
| 6,431,555 B1 | * | 8/2002 | Schroder et al. ............ 277/628 |
| 6,464,232 B1 | * | 10/2002 | Marchi et al. .............. 277/630 |
| 6,658,853 B2 | * | 12/2003 | Matsuda et al. .............. 60/753 |

FOREIGN PATENT DOCUMENTS

JP   8-285284   11/1996
JP   B2 2852110   11/1998

* cited by examiner

*Primary Examiner*—Alison K. Pickard
(74) *Attorney, Agent, or Firm*—Oliff & Berridge, PLC

(57) ABSTRACT

A sealing structure for sealing a gap between a combustor liner having an outer surface and a surrounding structure surrounding the combustor liner, includes: an annular sealing member held on the surrounding structure so as to be in contact with the outer surface of the combustor liner. The sealing member includes a plurality of sealing segments arranged in an annular configuration. The sealing structure seals the gap around the combustor liner of the combustor and absorbs, the difference in thermal expansion between the combustor liner and the surrounding structure.

4 Claims, 10 Drawing Sheets

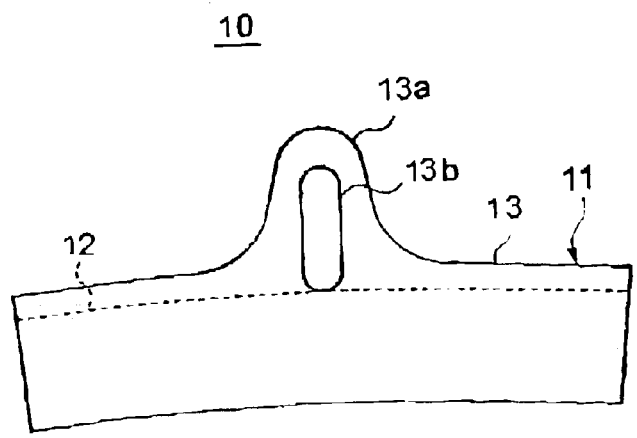
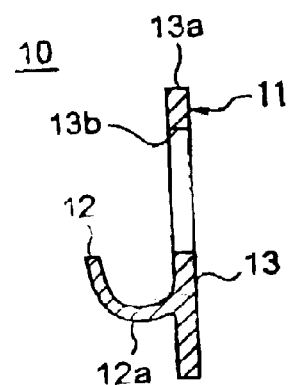
FIG. 3A  FIG. 3B
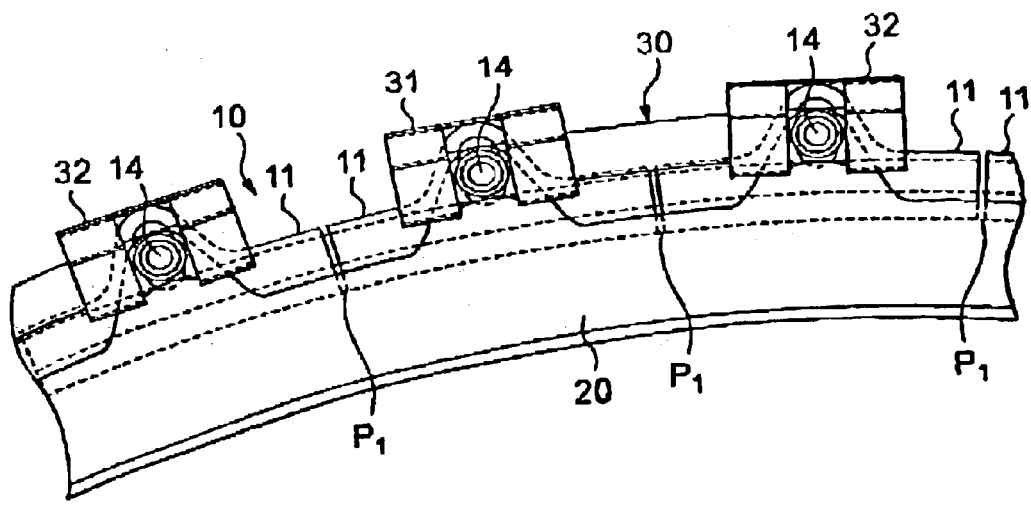
FIG. 4

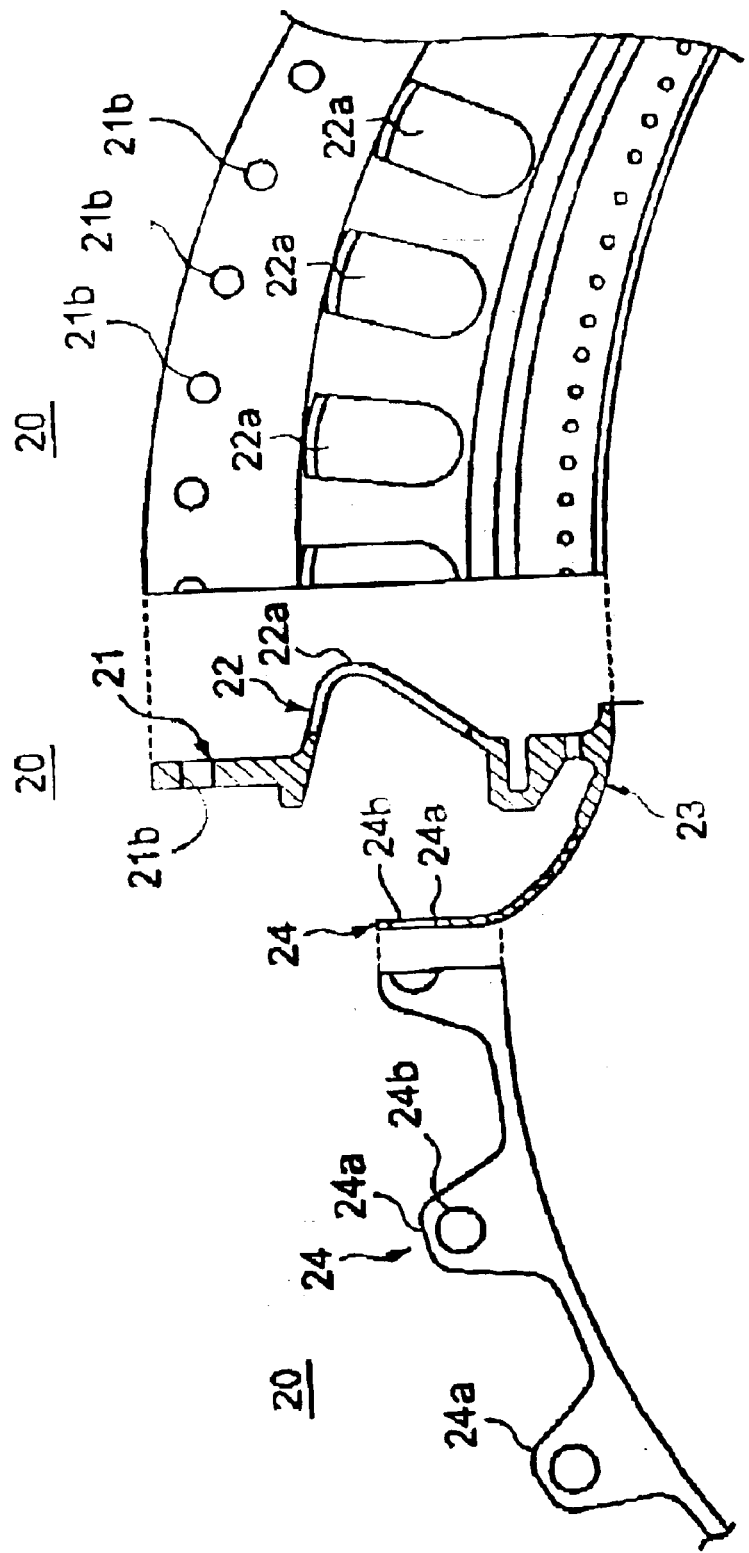

SEALING STRUCTURE FOR COMBUSTOR LINER

BACKGROUND OF THE INVENTION

1. Field of the Invention

The present invention relates to a sealing structure for sealing a gap around a combustor liner. More specifically, the present invention relates to a sealing structure for a sealing gap around a combustor liner for a gas turbine to be used as, for example, an aircraft engine.

2. Description of the Related Art

Development of ceramic materials, such as CMCs (ceramics matrix composites), superior in heat resistance in comparison to conventional metallic materials has made progress in recent years, and studies have been made to use such ceramic materials for forming combustor liners. In the case of the conventional combustor liner made of a metallic material having low heat resistance, it is difficult to significantly reduce the amount of cooling air for cooling the combustor liner. On the other hand, when a combustor liner made of a ceramic material having high heat resistance is used as a combustor, it is possible to reduce the amount of cooling air, to improve the thermal efficiency of the combustor, and to reduce mission of nitrogen oxides by using surplus cooling air for producing a lean combustion.

However, since ceramic materials, in general, are brittle and have linear expansion coefficients smaller than those of metallic materials, the difference in thermal expansion between a combustor liner of a ceramic material and structures of metallic materials surrounding the combustor liner is large while the combustor operates under the condition of high temperature. Thus, a sealing structure sealing gaps between the combustor liner of a ceramic material and the associated surrounding structures of metallic materials must be capable of absorbing the difference in thermal expansion.

Referring to FIGS. 13A and 13B, a conventional sealing structure for a combustor liner proposed in Japanese Patent No. 2852110 includes a plate spring 103 sealing a gap between a premixer 101 and a liner 102, and capable of elastically deforming to absorb the displacement of the liner 102 relative to the premixer 101. A sealing structure disclosed in JP8-285284A includes a plate spring sealing the gap between a liner and a transition piece.

Thus, most conventional sealing structures for sealing gaps around combustor liners use plate springs to absorb the difference in thermal expansion between the combustor liner and the associated surrounding structure. Such a plate spring used for absorbing the difference in thermal expansion must have a low rigidity so that an excessive stress may not be induced in the plate spring and the liner may not be excessively loaded, and hence the plate spring must have a big length.

The difference in thermal expansion coefficient between a CMC and a metal is large, and a plate spring used for sealing the gap between a liner of a CMC and the associated surrounding structure of a metal needs to have a long length and needs a large space for installation. Such requisite conditions for using a combustor liner of a CMC is very disadvantageous in applying the combustor liner to a gas turbine serving as an aircraft engine in which reduction of weight and space for installation is very important.

The dimensions of a large, long plate spring used for sealing the gap around the combustor liner of a CMC change greatly when the plate spring is heated and, consequently, the plate spring is unable to maintain a stable sealing function at high temperatures.

The plate spring of the foregoing conventional sealing structure is placed in direct contact with the combustor liner. Therefore, when the plate spring is used for sealing the gaps around a combustor liner of a CMC that is heated at higher temperatures in comparison to a combustor liner of a metal, it is possible that the elasticity of the plate spring is lost due to creep and the sealing function of the plate spring is deteriorated in a short period of operation.

SUMMARY OF THE INVENTION

The present invention has been made in view of the aforementioned problems in the related art and it is therefore an object of the present invention to provide a sealing structure for sealing a gap around a combustor liner, capable of absorbing the difference in thermal expansion between the combustor liner and an associated surrounding structure and of satisfactorily sealing the gap around the combustor liner.

According to the present invention, a sealing structure for sealing a gap between a combustor liner having an outer surface and a surrounding structure surrounding said combustor liner, comprises: an annular sealing member held on said surrounding structure so as to be in contact with said outer surface of said combustor liner, said sealing member including a plurality of sealing segments arranged in an annular configuration.

The sealing structure further comprises a sealing member support member fixed to said surrounding structure; and a pressing unit configured to press said sealing member, wherein each of said sealing segments has a sealing part and a connecting part connecting said sealing part to said sealing member support member, and wherein said sea ling part is kept in contact with said outer surface of said combustor liner by pressing said connecting part by said pressing means.

Preferably, said pressing means is formed by connecting a pair of bifurcate, U-shaped plate springs with a connecting part.

Preferably, said sealing member support member supports each of raid sealing segments so as to be movable in a predetermined range.

Preferably, said sealing member support member has a contact surface in contact with said sealing segments and is provided with holes for bolts in said contact surface respectively corresponding to said bifurcate, U-shaped plate springs.

The sealing structure of the present invention is capable of satisfactorily sealing the gap around the combustor liner without excessively loading the combustor liner even if the difference in thermal expansion between the combustor liner and the surrounding structure is large.

BRIEF DESCRIPTION OF THE DRAWINGS

The above and other objects, features and advantages of the present invention will become more apparent from the following description taken in connection with the accompanying drawings, in which:

FIGS. 3A and 3B are a rear elevation and a sectional view, respectively, of an outer sealing member included in the sealing structure shown in FIG. 1;

FIG. 4 is a fragmentary rear elevation of an outer sealing structure;

FIGS. 6A, 6B and 6C are a front elevation of a seal member support part of an outer sealing member support member, a sectional view of the outer sealing member support member and a rear elevation of the outer sealing member support member, respectively;

DESCRIPTION OF THE PREFERRED EMBODIMENTS

Figure 1:
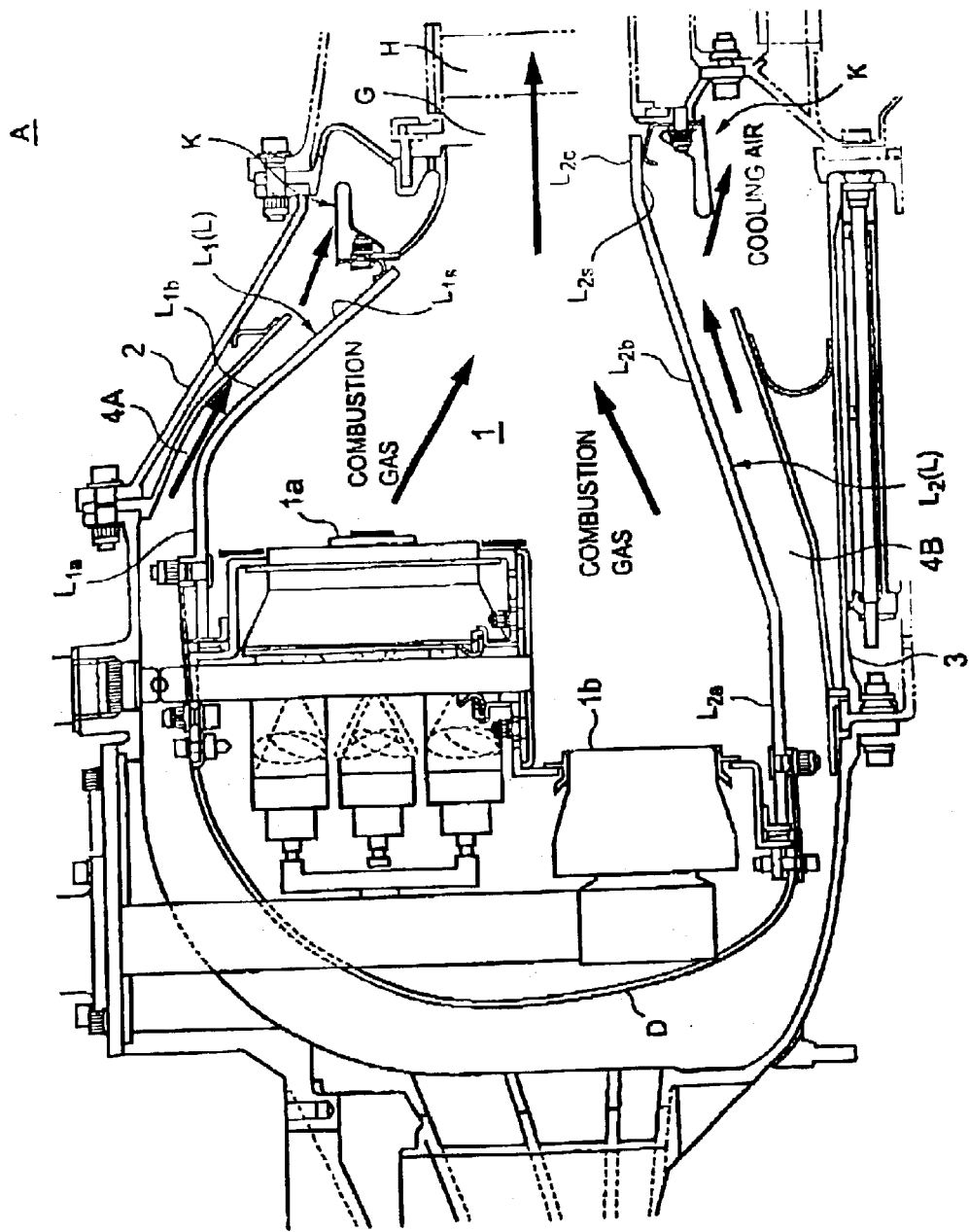
FIG. 1 is a schematic sectional view of a combustor having a combustor liner, and a sealing structure in a preferred embodiment according to the present invention for sealing gaps around the combustor liner.

FIG. 1 shows a combustor A provided with a sealing structure in a preferred embodiment according to the present invention. The combustor A is an annular combustor included in a gas turbine as, for example, an aircraft engine. The combustor A has a toroidal combustion chamber 1, and includes an outer case 2, a combustor liner L, and an inner case 3.

Main burner units 1a and pilot burner units 1b are disposed in the combustion chamber 1. The combustor liner L consists of an annular outer liner $L_1$ and an annular inner liner $L_2$ of a diameter smaller than that of the outer liner $L_1$. The liners $L_1$ and $L_2$ are formed of a ceramic material, such as a CMC, i.e., a fiber-reinforced composite ceramic material. The combustion chamber 1 is defined by the outer liner $L_1$, the inner liner $L_2$, and a dome D of a metal joined to the ends of the liners $L_1$ and $L_2$. An outer cooling air passage 4A is defined by the outer case 2 and the outer liner $L_1$, and an inner cooling air passage 4B is defined by the inner case 3 and the inner liner $L_2$.

The outer liner $L_1$ serves as an external circumferential wall of the combustion chamber 1. The outer liner $L_1$ has a horizontal part $L_{1a}$ and a taper part $L_{1b}$. The diameter of the horizontal part $L_{1a}$ is constant from a proximal end part, which is connected with the dome D, to a middle part. The diameter of the taper part $L_{1b}$ is gradually decreasing from the middle part to a distal end part.

The inner liner $L_2$ serves as an inner circumferential wall of the combustion chamber 1. The inner liner $L_2$ has a cylindrical small-diameter part $L_{2a}$ of a predetermined length extending from the proximal end of the inner liner $L_2$ joined to the dome D, a conical middle part $L_{2b}$ extending from the end of the cylindrical small-diameter part $L_{2a}$ and expanding toward its distal end, and a cylindrical large-diameter part $L_{2c}$ having a diameter greater than that of the cylindrical small-diameter part $L_{2a}$ and extending from the end of the conical middle part $L_{2b}$ toward the end of the inner liner $L_2$.

Figure 2:
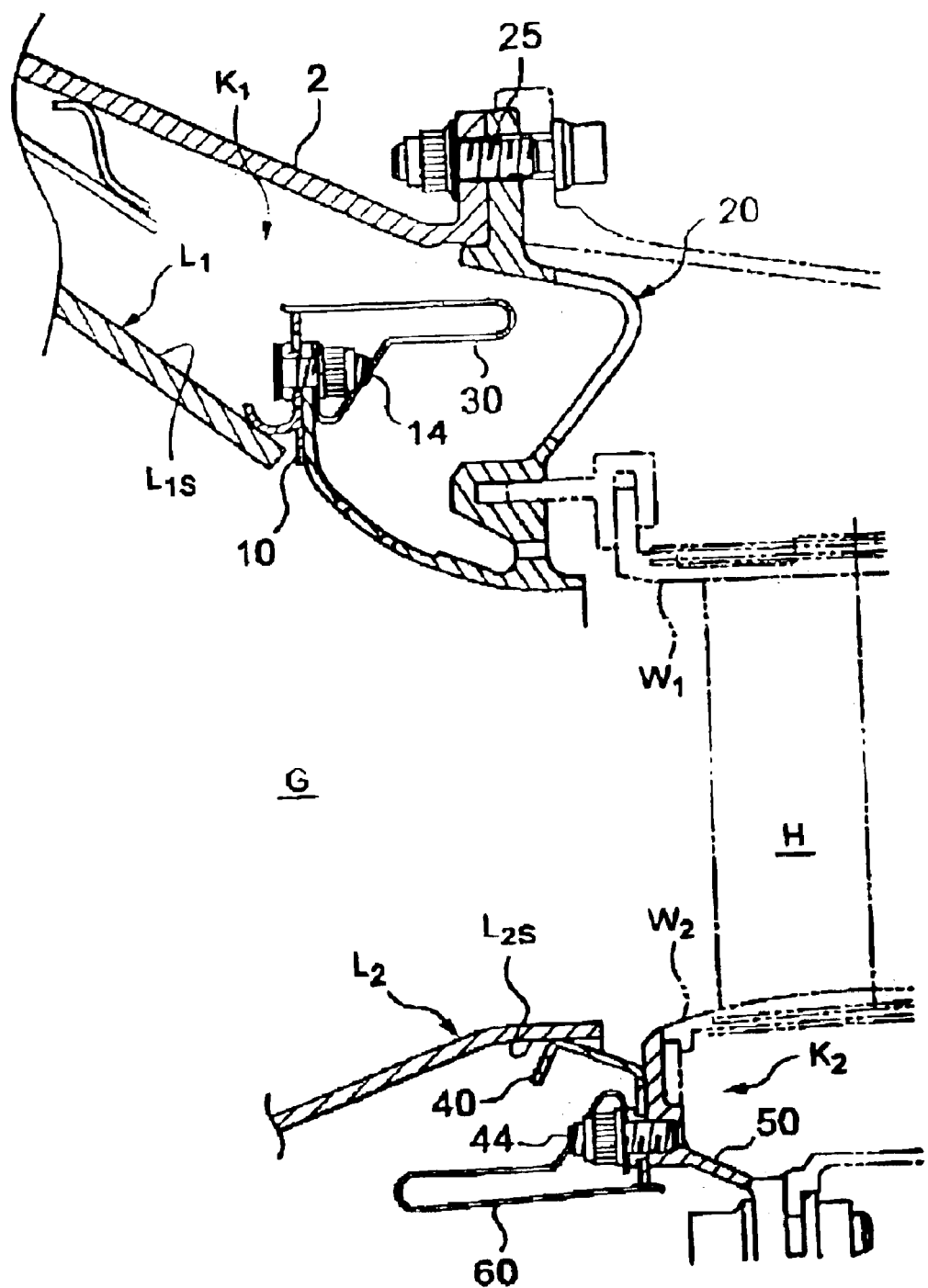
FIG. 2 is a schematic sectional view of the sealing structure shown in FIG. 1.

As shown in FIGS. 1 and 2, a gap between the respective rear ends of the outer liner $L_1$ and the inner liner $L_2$ serves as a combustor outlet G. A sealing structure K for sealing the joint of the combustor outlet C and a turbine inlet H defined by an outer circumferential wall $W_1$ and an inner circumferential wall $W_2$ of a turbine is formed to prevent leakage of the cooling air from the cooling air passages 4A and 4B into the turbine inlet H.

Referring to FIG. 2, the sealing structure K includes an outer sealing structure $K_1$ sealing the joint of the outer liner $L_1$ and the outer circumferential wall $W_1$ of the turbine, and an inner sealing structure $K_2$ sealing the joint of the inner liner $L_2$ and the inner circumferential wall $W_2$ of the turbine.

The outer sealing structure $K_1$ includes, as principal components, an outer sealing member 10, an outer sealing member support member 20 supporting the outer sealing member 10 so as to be movable in a predetermined range, and an outer retainer 30 pressing the outer sealing member 20 against the outer surface $L_{1s}$ of the outer liner $L_1$.

The inner sealing structure $K_2$ includes, as principal components, an inner sealing member 40, an inner sealing member support member 50 supporting the inner sealing member 40 so as to be movable in a predetermined range, and an inner retainer 60 pressing the inner sealing member 40 against the entire surface $L_{2s}$ of the inner liner $L_2$.

The outer sealing structure $K_1$ and the inner sealing structure $K_2$ will be described in detail hereunder.

FIGS. 3A, 3B and 4 show the outer sealing member 10 of the outer sealing structure $K_1$. FIGS. 3A and 3B show one of sealing segments 11 of a metal forming the outer sealing member 10, and FIG. 4 shows the sealing segments 11 arranged in an annular configuration so as to form the outer sealing member 10.

The outer sealing member 10 is an annular member of a metal and is in contact with the entire surface of a rear end part of the outer liner $L_1$. The outer sealing member 10 is thus formed of the plurality of sealing segments 11 in order that the outer sealing member 10 is able to exhibit a satisfactory sealing function regardless of the difference in thermal expansion between the outer sealing member 10 and the outer liner $L_1$.

The sealing segments 11 of a predetermined circumferential length as shown in FIGS. 3A and 3B are formed by dividing an annular member into a plurality of segments, and the outer sealing member 10 is formed by arranging the sealing segments 11 in a circumferential arrangement with a predetermined gap $P_1$ between the adjacent sealing segments 11 as shown in FIG. 4.

Referring to FIGS. 3A and 3B, the sealing segment 11 has a sealing part 12 to be set in contact with the outer surface Los of the outer liner $L_1$ for sealing, and a flat connecting part 13 to be joined to the outer sealing member support member 20. The sealing part 12 extends from one surface of the connecting part 13. The sealing part 12 extends through the entire circumferential length of the sealing segment 13.

The sealing part 12 is curved so as to protrude radially inward and has a semicircular sectional shape as shown in FIG. 3B. The sealing part 12 having the semicircular sectional shape has, a round sealing surface 12a in line contact with the outer surface $L_{1s}$ of the outer liner $L_1$. The sealing part 12 does not necessarily need to have a semicircular sectional shape and may be formed in any desired sectional shape, such as a hooked sectional shape, provided that the sealing part 12 is able to come into linear contact with the outer surface $L_{1s}$ of the outer liner $L_1$.

The connecting part 13 has a curved inner edge having the shape of a partial circle of a radius corresponding to that of the rear end edge of the outer liner $L_1$, and a circular outer edge having the shape of a partial circle of a radius equal to that of the rear end edge of the outer liner $L_1$ plus the width of the connecting part 13. A projection 13a provided with a slot 13b projects radially outward from a muddle part of the outer edge of the connecting part 13. A bolt 14 is passed through the slot 13b to support the sealing segment 11 on the outer sealing member support member 20 so as to be movable along a radius of the combustor A in a predetermined radial range.

Figure 5:
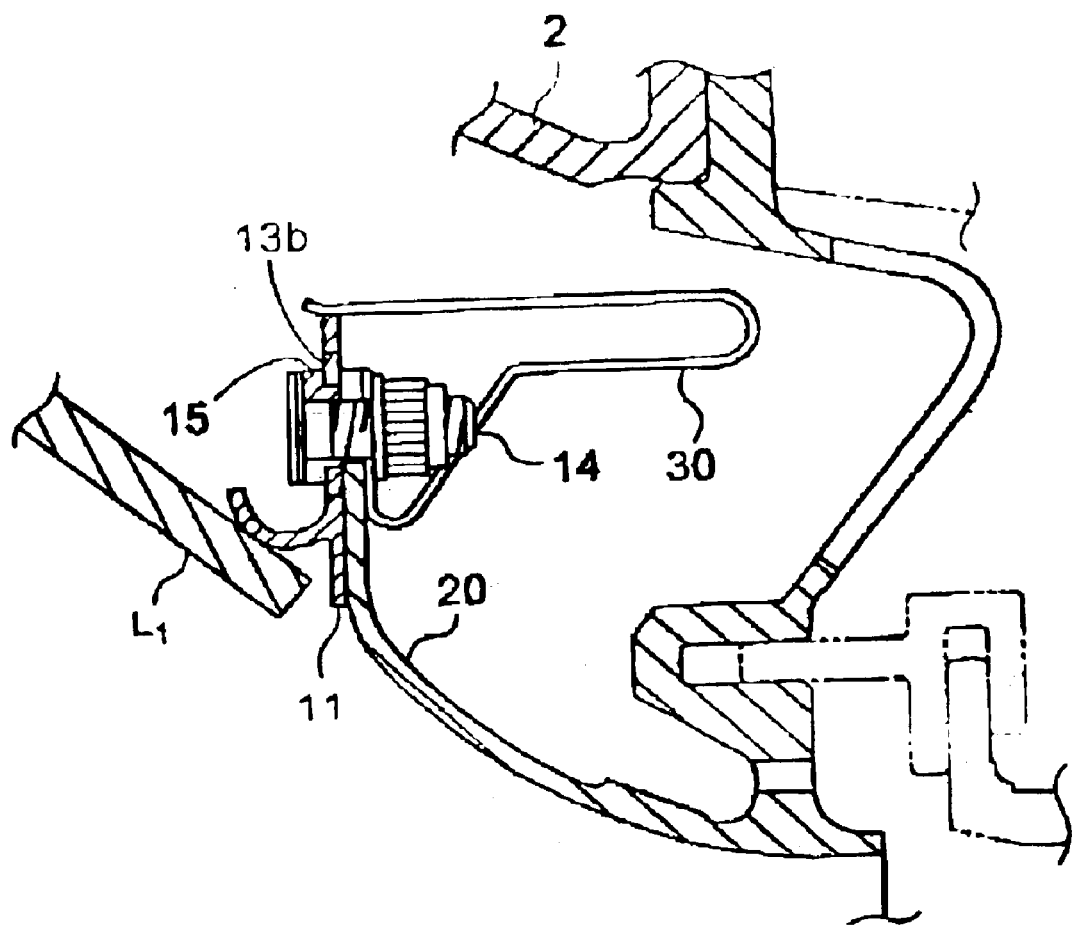
FIG. 5 is a sectional view of the outer sealing structure shown in FIG. 4.

As shown in FIG. 5, a cylindrical spacer 15 is put on the bolt 14 passed through the slot 13b to form a gap between the sealing segment 11 and the outer sealing member support member 20.

Referring to FIGS. 6A, 6B and 6C, the outer sealing member support member 20 is an annular member of a metal having a fixed outer part 21 fastened to the outer case 2, a middle part 22 extending radially inward from the radially inner side of the outer part 22 and curved so as to protrude downstream in the outer cooling air passage 4A, an inner part 23, i.e., a connecting part, having an upper portion extending radially inward from the radially inner side of the middle part 22 and a lower portion extending in a curve from the radially inner side of the upper portion toward the rear end of the outer liner $L_3$, and a seal support part 24 extending radially outward from the distal end of the lower part 23.

Through holes 21b are formed in the fixed outer part 21 at equal angular intervals. Bolts 25 (FIG. 2) are passed through the through holes 21b to fasten the outer sealing member support member 20 to the outer case 2.

Openings 22a are formed at equal angular intervals in the middle part 22. The cooling air flows downstream through the openings 22a. The seal support part 24 has projections 24a arranged at equal angular intervals and respectively provided with round holes 24b. Bolts 14 are passed through the round holes 24b. The number of the projections 24a is equal to that of the sealing segments 11.

Figure 7A:
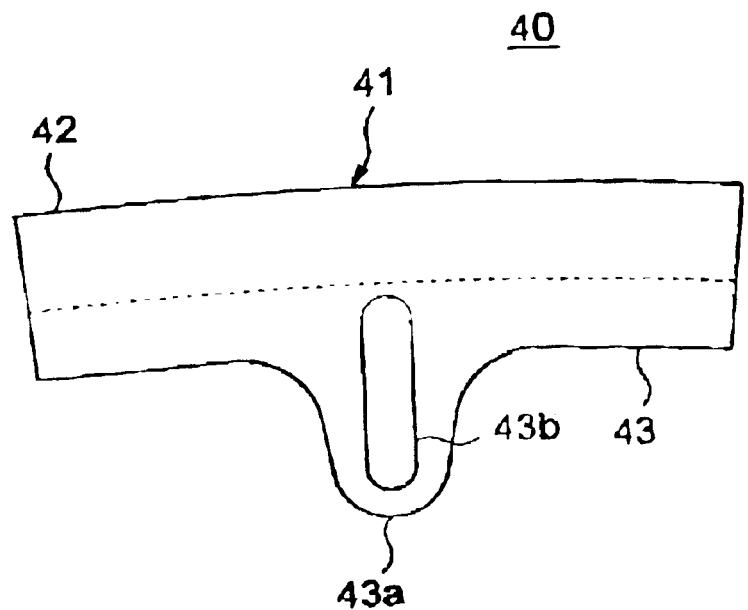
FIGS. 7A and 7B are a rear elevation and a sectional view, respectively, of an inner sealing member.
Figure 7B:
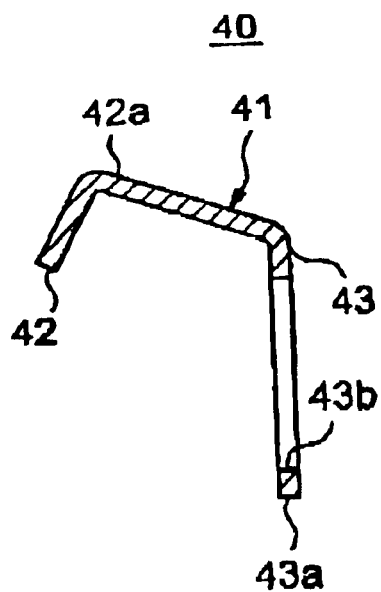

The inner sealing member 40 will be described with reference to FIGS. 7A, 7B and 8 hereunder. FIGS. 7A and 7B show one of sealing segments 41 of a metal forming the inner sealing member 40, and FIG. 8 shows the sealing segments 41 arranged in an annular configuration so as to form the inner sealing member 40.

The inner sealing member 40 is an annular member of a metal and is in contact with the entire surface of a rear end part of the inner liner $L_2$. The inner sealing member 40 is thus formed of the plurality of sealing segments 41 in order that the inner sealing member 40 is able to exhibit a satisfactory sealing function regardless of the difference in thermal expansion between the inner sealing member 40 and the inner liner $L_2$.

Figure 8:
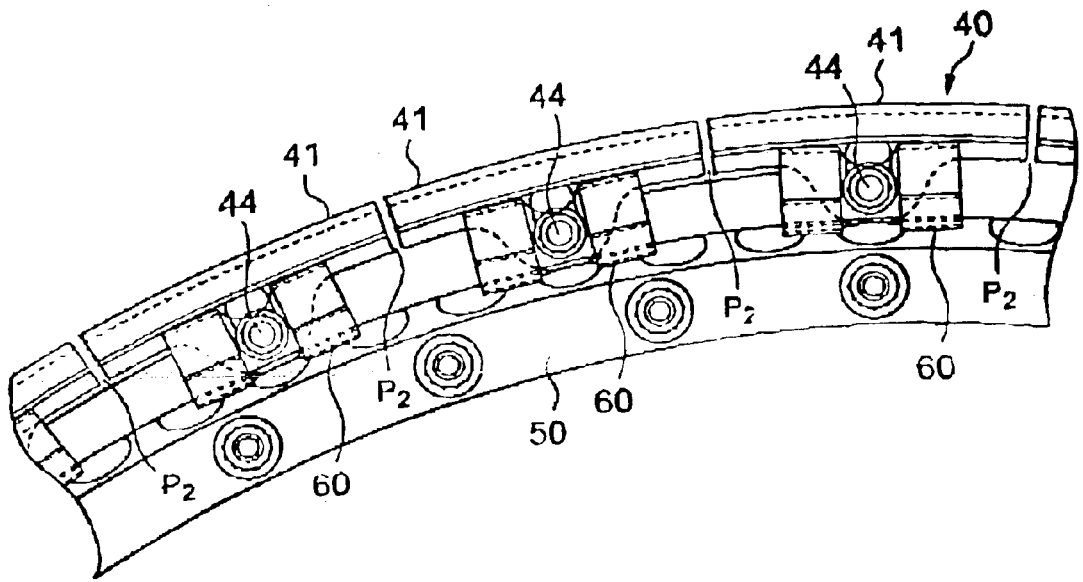
FIG. 8 is a fragmentary rear elevation of an inner sealing structure.

The sealing segments 41 of a predetermined circumferential length as shown in FIGS. 7A and 7B are formed by dividing an annular member into a plurality of segments, and the inner sealing meter 40 is formed by arranging the sealing segments 41 in a circumferential arrangement with a predetermined gap $P_2$ between the adjacent sealing segments 41 as shown in FIG. 8.

Referring to FIGS. 7A and 7B, the sealing segment 41 has a sealing part 42 to be set in contact with the entire surface $L_{2s}$ of the inner liner $L_2$ for sealing, and a flat connecting part 43 to be joined to the inner sealing member support mater 50. The connecting part 43 is continuous with the sealing part 42.

The sealing part 42 extends radially outward from the connecting part 43. The sealing part 42 has a hooked sectional shape as shown in FIG. 7B. The sealing part 42 has a contact surface 42a in line contact with the inner liner $L_2$.

The connecting part 43 has a curved outer edge having the shape of a partial circle of a radius corresponding to that of the rear end edge of the inner liner $L_2$. A projection 43a provided with a slot 43b projects radially inward from a middle part of the inner edge of the connecting part 43. A bolt 44 is passed through the slot 43b to support the sealing segment 41 on the inner sealing member support member 50 so as to be movable along a radius of the combustor A in a predetermined radial range.

Figure 9:
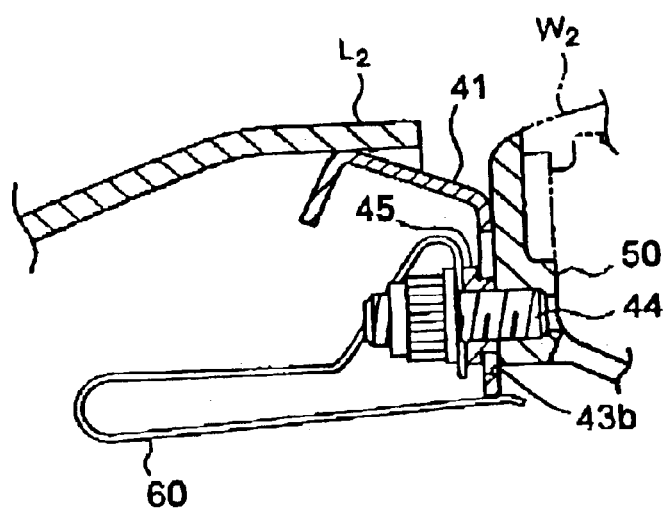
FIG. 9 is a sectional view of the inner sealing structure.

As shown in FIG. 9, a cylindrical spacer 45 is put on the bolt 44 passed through the slot 43b to form a gap between the sealing segment 41 and the inner sealing member support member 50.

Figure 10:
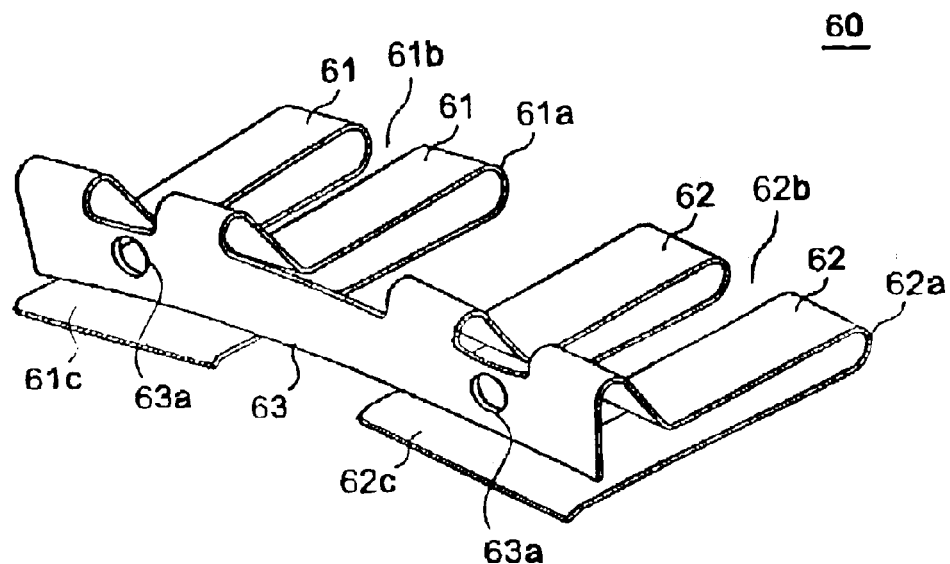
FIG. 10 is a perspective view of an inner retainer.
Figure 11:
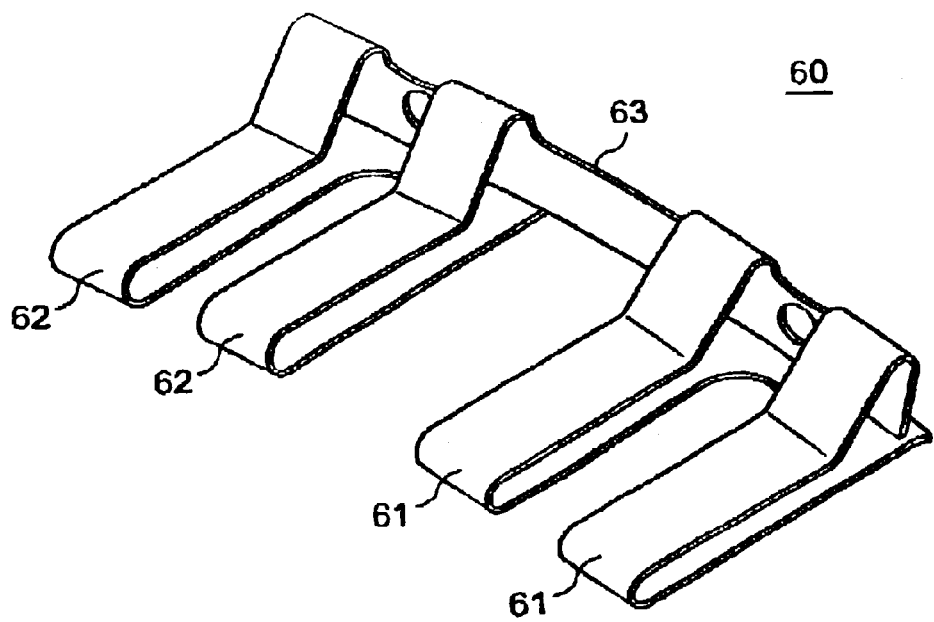
FIG. 11 is a perspective view of the inner retainer shown in FIG. 10 as viewed from a direction opposite to a direction from which the inner retainer is viewed in FIG. 10.
Figure 12:
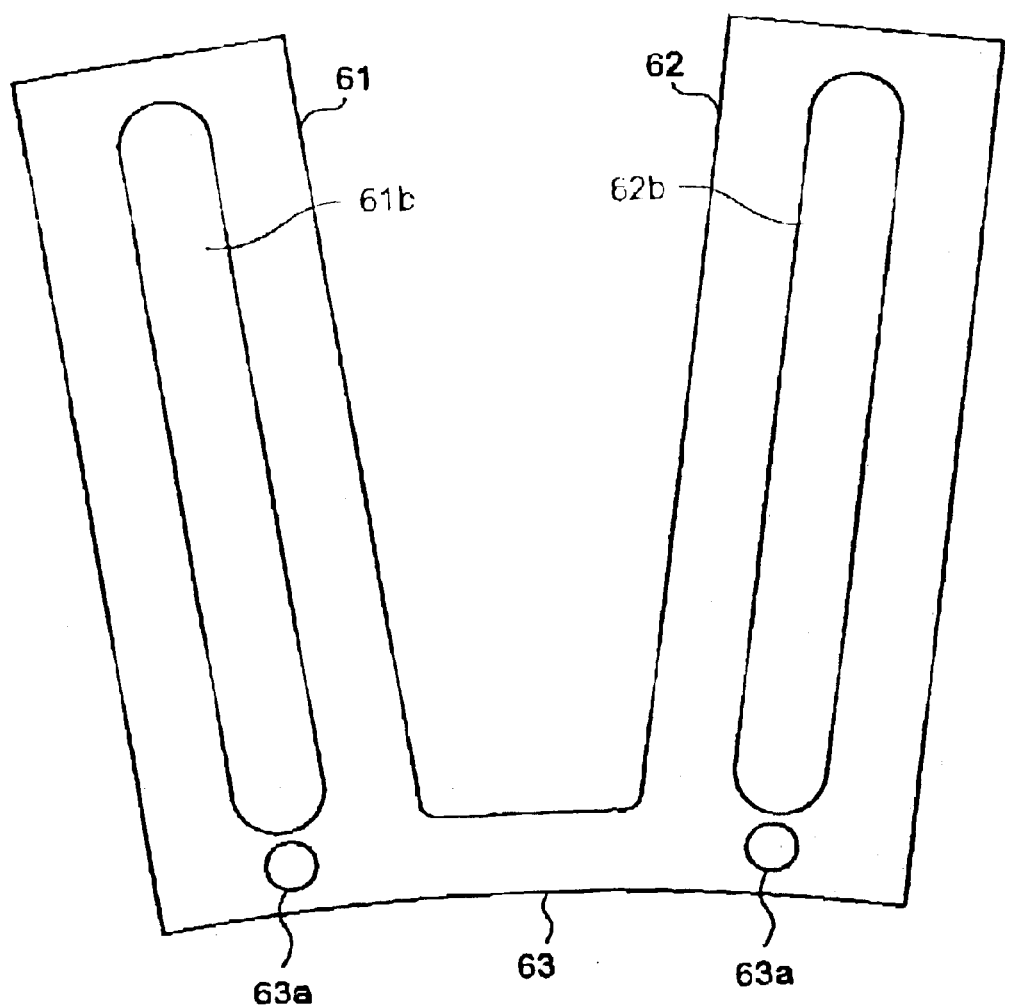
FIG. 12 is a development of the inner retainer shown in FIG. 10.
Figure 13A:
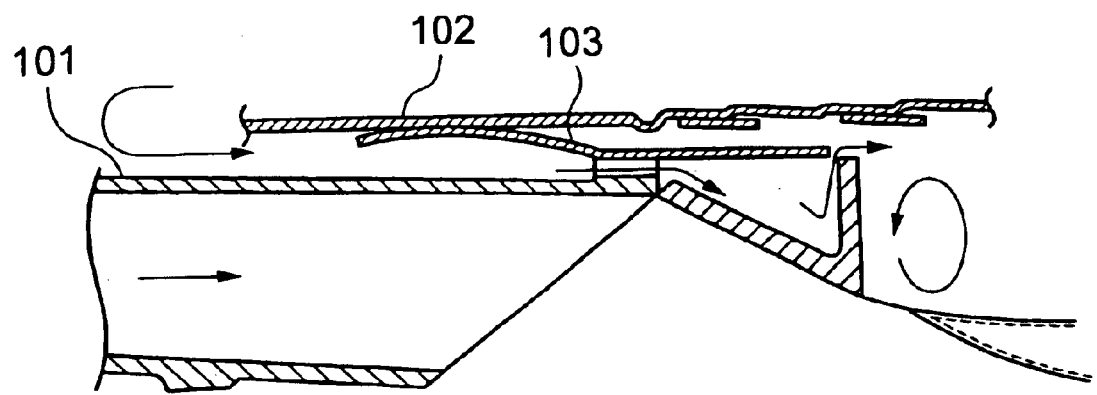
FIGS. 13A and 13B are a sectional view and a partly cutaway perspective view, respectively, of a conventional sealing structure.
Figure 13B:
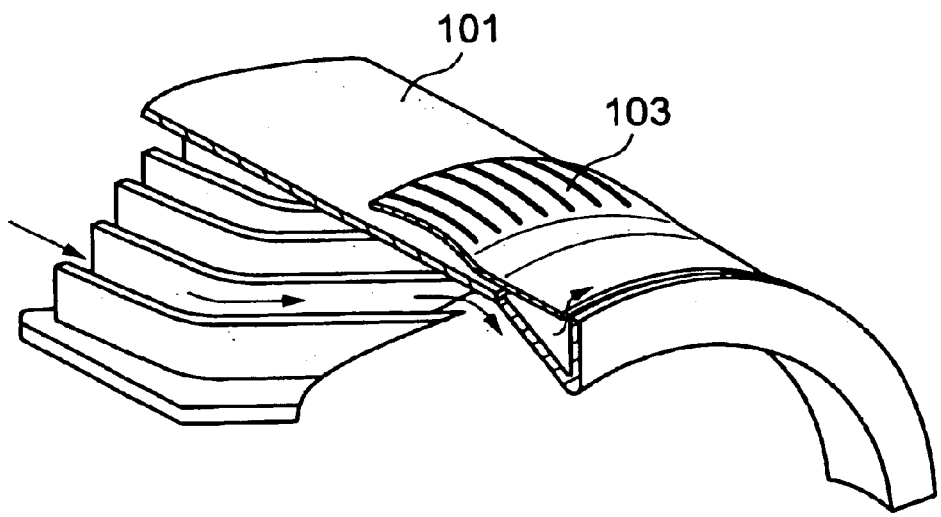

The inner retainer 60 as pressing means will be described with reference to FIGS. 10 to 12 hereunder. FIGS. 10 and 11 are perspective views of the inner retainer 60, and FIG. 12 is a development of the inner retainer 60.

Referring to FIGS. 10 and 11, the inner retainer 60 has two sets of resilient plate springs 61 and 62 for resiliently pressing the inner sealing segments 41 against the entire surface $L_{26}$ of the inner liner $L_2$, and a connecting part 63. The plate springs 61 and 62 and the connecting part 63 are formed integrally by pressing a metal plate shown in FIG. 12. Middle parts 61a and 62a of the metal plate is bent in a U-shape to form the plate springs 61 and 62. The plate springs 61 and 62 are connected by the connecting part 63.

Parts of the metal plate for forming the plate springs 61 and 62 are provided with long slots 61b and 62b to facilitate screwing the bolts 44. Thus, the plate springs 61 and 62 are Unshaped bifurcate plate springs. The inner retainer 60 is fastened to the inner sealing member support member 50 with two bolts such that free end parts 61c and 62c of the plate springs 61 and 62 are pressed against the tips of the projections 43a of the two sealing segments 41, respectively, to press the sealing segments 41 against the entire surface $L_{2s}$ of the inner liner $L_2$.

The connecting part 63 of the inner retainer 60 has the shape of an elongate circular plate curved so as to conform to the inner surface of rear end part of the inner liner $L_2$. The connecting part 63 is provided with two round holes 63a at positions on extensions of the axes of the slots 61b and 62b. The bolts 44 for supporting the sealing segments 41 on the inner sealing member support member 50 are passed through the round holes 63a. The inner retainer 60 thus fastened to the inner sealing member support member 50 with two bolts can be restrained from turning together with the sealing segments 41.

The outer retainer 30 pressing the outer sealing member 10 against the outer surface $L_{1s}$ of the outer liner $L_1$ is similar in shape to the inner retainer 60, except that the outer retainer 30 is curved in a direction opposite to that in which the inner retainer 60 is curved.

In the sealing structure K embodying the present invention, the outer sealing member 10 is formed of the predetermined number of the outer sealing segments 11, and the inner sealing member 40 is formed of the predetermined number of the inner sealing segments 41. Therefore, excessive thermal stresses are not induced in the sealing members 10 and 40 and the sealing members 10 and 40 are not subject to excessive thermal deformation when the combustor A operates under the condition of high temperature, and the sealing members 10 and 40 are excellent in heat resistance. Accordingly, the sealing structure K as used in combination with the combustor liner of a CMC, which is heated at temperatures higher than those at which combustor liners of a metal are used and heated, is able to exhibit a stable sealing function.

Since the sealing surfaces of the sealing members 10 and 40 are in line contact with the entire surfaces $L_{1s}$ and $L_{2s}$ of the outer liner $L_1$ and the inner liner $L_2$, respectively, heat is transferred from outer liner $L_1$ and the inner liner $L_2$ to the sealing members 10 and 40 at a low rate. The cooling air that leaks properly from the cooling air passages through the gaps P1 between the outer sealing segments 11 and the gaps P2 between the inner sealing segments 41 prevents the excessive heating of the sealing members 10 and 40, which enhances the durability of the sealing members 10 and 40.

Since the retainers 30 and 60, i.e., the pressing means, are formed substantially in U-shapes of comparatively small dimensions, and have a comparatively low rigidity, the retainers 30 and 60 are capable of absorbing the difference in thermal expansion between the liner L and the associated surrounding structures, of enabling the sealing members 10 and 40 to maintain the sealing function and of avoiding excessively loading the liner L even if the difference in thermal expansion between the liner L and the associated surrounding structures is large.

Since the retainers 30 and 60, i.e., the pressing means, are not in direct contact with the outer liner $L_1$ and the inner liner $L_2$, deformation of the retainers 30 and 60 due to creep at high temperatures can be avoided and, consequently, the sealing members 10 and 40 are able to maintain the stable sealing function.

Since the sealing segments 11 and 41 are pressed resiliently by the resilient plate springs 61 and 62 having uniform resilience individually against the outer liner $L_1$ and the inner liner $L_2$, respectively, the gaps around the outer liner $L_1$ and the inner liner $L_2$ can be uniformly sealed.

Since the sealing segments 11 and 41 are pressed against the entire surfaces $L_{1s}$ and $L_{2s}$ of the outer liner $L_1$ and the inner liner $L_2$, respectively, by the pressure difference between the outside and the inside of the liner L when the gas turbine operates, the sealing effect of the sealing segments 11 and 41 is enhanced.

Since the sealing structure K of the present invention does not require the complex machining of the ceramic liner, which is hard to machine, the outer liner $L_1$ and the inner liner $L_2$ can be easily manufactured.

The flow of the cooling air can be reduced by forming the liner of the combustor of a heat-resistant ceramic material, the thermal efficiency can be improved, and the emission of nitrogen oxides can be reduced through the improvement of thermal efficiency and the use of surplus air for lean combustion.

The present invention is not limited to the foregoing embodiment in its practical application and various changes and modifications may be made. For example, the inner part 23 of the outer sealing member support member 10 of the outer sealing structure $K_1$ may be omitted if the construction of the combustor permits such a configuration.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof

What is claimed is:

1. A sealing structure for sealing a gap between a combustor liner having an outer surface and a surrounding structure surrounding said combustor liner, comprising:

a plurality of sealing segments, arranged in an annular configuration, forming an annular sealing member, each of said sealing segments separately connected to said surrounding structure so as to separately contact said outer surface of said combustor liner;

a sealing member support member fixed to said surrounding structure; and a pressing unit configured to press said sealing member, each of said sealing segments having a sealing part and a connecting part connecting said sealing part to said sealing member support member, and said sealing part contacting said outer surface of said combustor liner by pressing said connecting part by said pressing unit.

2. The sealing structure according to claim 1, said pressing unit is formed by connecting a pair of bifurcate, U-shaped plate springs with a connecting part.

3. The sealing structure according to claim 2, said sealing member support member including a contact surface in contact with said sealing segments and including holes for bolts in said contact surface respectively corresponding to said bifurcate, U-shaped plate springs.

4. The sealing structure according to claim 1, said sealing member support member supporting each of said sealing segments so as to be movable in a predetermined range.

* * * * *